United States Patent
Cano (10) Patent No.: US 9,630,564 B1
(45) Date of Patent: Apr. 25, 2017

(54) VEHICLE STORAGE COMPARTMENT STRUCTURE

(71) Applicant: Nissan North America, Inc., Franklin, TN (US)

(72) Inventor: Sandra Cano, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/927,719

(22) Filed: Oct. 30, 2015

(51) Int. Cl.
*B60R 7/04* (2006.01)

(52) U.S. Cl.
CPC ..................... *B60R 7/04* (2013.01)

(58) Field of Classification Search
CPC ....................................... B60R 7/04
USPC ......................................... 296/37.8
See application file for complete search history.

(56) References Cited

U.S. PATENT DOCUMENTS

| | | | |
|---|---|---|---|
| 4,190,284 A | | 2/1980 | Schmidhuber et al. |
| 4,568,117 A * | | 2/1986 | McElfish .............. B60N 3/102 224/280 |
| 5,823,599 A * | | 10/1998 | Gray .................... B60K 37/00 224/929 |
| 6,231,099 B1 | | 5/2001 | Greenwald ............ B60R 7/06 220/531 |
| 6,431,391 B1 * | | 8/2002 | Kaupp .................. B60N 3/102 220/737 |
| 7,278,681 B2 * | | 10/2007 | Lilov ................... B60N 2/4646 248/311.2 |
| 8,002,323 B2 * | | 8/2011 | Jones .................... B60R 7/04 296/24.34 |
| 8,011,681 B2 | | 9/2011 | Plavetich |
| 8,517,447 B2 | | 8/2013 | Biggs |
| 9,156,407 B1 * | | 10/2015 | Kramer ................. B60R 7/04 |
| 9,387,808 B2 * | | 7/2016 | Kearney ................ B60R 7/04 |
| 2013/0134729 A1 * | | 5/2013 | Zimmerman .......... B60R 7/04 296/24.34 |
| 2015/0367784 A1 * | | 12/2015 | Bergerioux ............ B60R 7/04 296/37.8 |

FOREIGN PATENT DOCUMENTS

FR 2746068 A1 * 9/1997 ............... B60R 7/06

* cited by examiner

*Primary Examiner* — Pinel Romain
(74) *Attorney, Agent, or Firm* — Global IP Counselors, LLP (57) ABSTRACT

A compartment housing defines a compartment opening. A pivoting structure is disposed within the compartment housing for pivoting movement about a pivot axis that extends through the compartment housing. The pivoting structure has first, second and third walls that extend away from the pivot axis. Distal edges thereof are spaced apart from one another relative to a circumferential direction about the pivot axis. The pivoting structure pivots between a first orientation and a second orientation. In the first orientation: the first and second walls are exposed thru the compartment opening; the third wall is concealed within the compartment housing; and a storage space between the second and third walls is concealed within the compartment housing. In the second orientation: the second and third walls, and the storage space are exposed thru the compartment opening; and the first wall is concealed within the compartment housing.

20 Claims, 12 Drawing Sheets

VEHICLE STORAGE COMPARTMENT STRUCTURE

BACKGROUND

Field of the Invention

The present invention generally relates to a vehicle storage compartment structure. More specifically, the present invention relates to a vehicle storage compartment structure that includes a pivoting structure that is installed within a vehicle passenger compartment.

Background Information

Vehicle passenger compartments typically include at least one storage compartment, such as a glovebox in the instrument panel and/or a compartment within a center console. Such compartments are concealed by a cover or door that moves between an open position and a closed position. However, the cover or door is clearly visible within the vehicle passenger compartment and easily identified as a cover or door.

SUMMARY

One object of the present disclosure is to provide a passenger compartment with a storage compartment that does not include a recognizable door or cover.

Another object of the present disclosure is to provide a passenger compartment with a pivoting structure that moves between a first orientation concealing a storage area and a second orientation exposing the storage area, the storage area being defined between two walls that rotate with the pivoting structure.

In view of the state of the known technology, one aspect of the present disclosure is to provide a vehicle storage compartment structure with a compartment housing and a pivoting structure. The compartment housing is fixedly installed within a vehicle passenger compartment and defines a compartment opening. The pivoting structure is disposed within the compartment housing for pivoting movement about a pivot axis that extends through the compartment housing. The pivoting structure has a first wall, a second wall and a third wall, each extending from the pivot axis outward and away therefrom. Distal edges of each of the first, second and third walls are spaced apart from one another relative to a circumferential direction about the pivot axis. The pivoting structure is pivotal about the pivot axis between a first orientation and a second orientation. In the first orientation the first wall and the second wall are exposed thru the compartment opening with the third wall is concealed within the compartment housing, and a storage space defined between the second wall and the third wall is concealed within the compartment housing. In the second orientation the second wall, the third wall and the storage space are exposed thru the compartment opening with the first wall being concealed within the compartment housing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
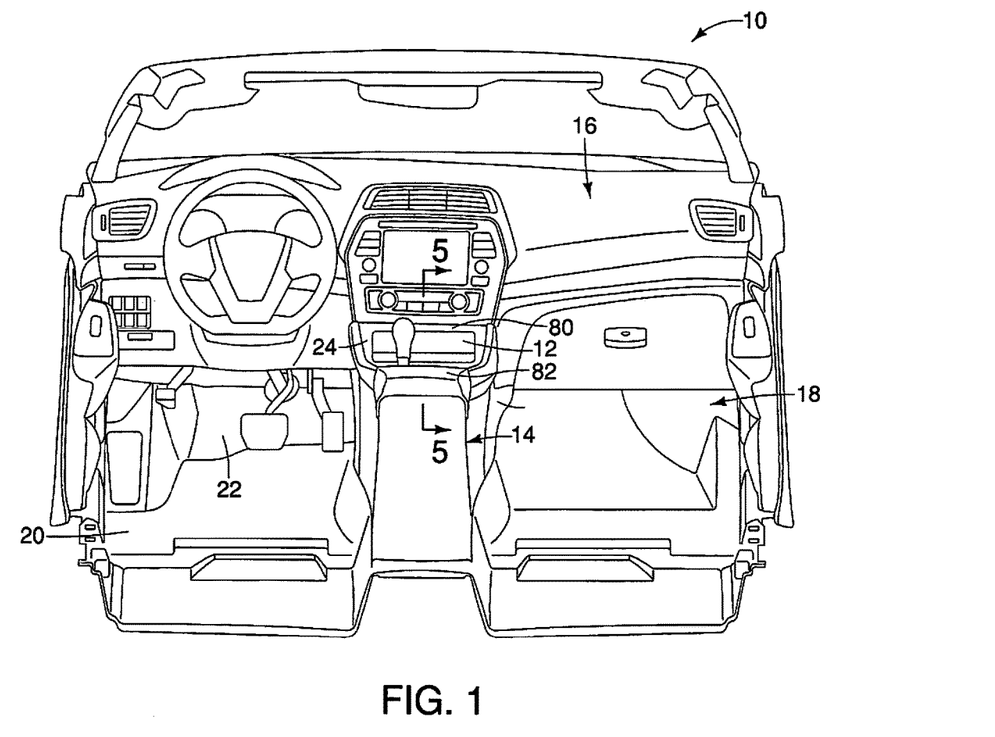
FIG. 1 is a plan view of a passenger compartment of a vehicle showing a storage compartment structure in accordance with a first embodiment.
Figure 2:
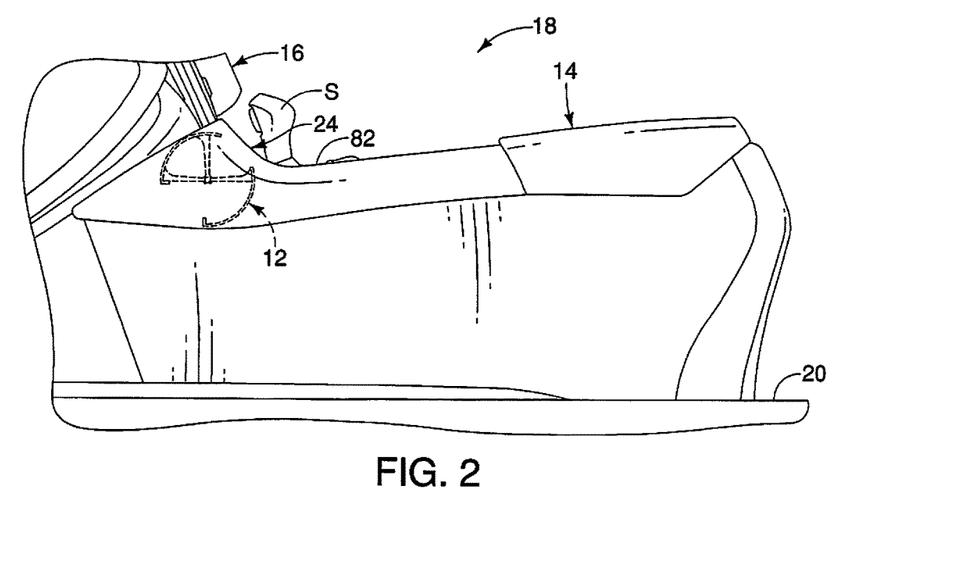
FIG. 2 is a side view of a portion of the passenger compartment showing the storage compartment structure located at an intersection of an instrument panel and a center console in accordance with the first embodiment.

Referring initially to FIG. 1, a vehicle 10 is illustrated in accordance with a first embodiment. As shown in FIG. 2, the vehicle 10 includes a compartment structure 12 that blends in with the overall structure of a center console 14 and an instrument panel 16 within a passenger compartment 18 of the vehicle 10. The compartment structure 12 is described in greater detail below.

The vehicle 10 has a body structure (not shown) that defines the passenger compartment 18. The passenger compartment 18 includes a floor 20 and a dashwall 22 that separates the passenger compartment 18 from an engine compartment (not shown). Since vehicle floors and dashwalls are conventional structures, further description is omitted for the sake of brevity.

The center console 14 is installed to the floor 20 and extends between front seats (not shown) within the passenger compartment 18 in a conventional manner via, for example, mechanical fasteners (not shown). The instrument panel 16 is installed to the dashwall 22 within the passenger compartment 18 in a conventional manner via, for example, mechanical fasteners (not shown).

As shown in FIGS. 1 and 2, the center console 14 extends forward within the passenger compartment 18 and beneath the instrument panel 16. In an area 24 at the intersection of the center console 14 and the instrument panel 16 (where the center console 14 and the instrument panel 16 either contact one another or where the center console 14 extends under the instrument panel 16), many vehicles have a tray or storage space that is open and fully exposed to the passenger compartment 18. In a first embodiment as indicated in FIGS. 1 and 2, the compartment structure 12 is located in the area 24 at the intersection of the center console 14 and the instrument panel 16.

The compartment structure 12 can be installed to one or both of the center console 14 and the instrument panel 16. Specifically, the compartment structure 12 can be attached via fasteners (not shown) to the center console 14, or can be attached via fasteners (not shown) to the instrument panel 16. Alternatively, the compartment structure 12 can be attached to both the center console 14 and the instrument panel 16.

As shown in FIGS. 1 and 2, the compartment structure 12 is visible from within the passenger compartment 18, but has no visible cover or door. In other words, the compartment structure 12 is provided in the absence of a separate cover or door. Rather, the compartment structure 12 is designed and configured to blend in with the surrounding surfaces in order to obscure its existence, as is described in greater detail below.

A description of the compartment structure 12 in accordance with a first embodiment is now provided with specific reference to FIGS. 3-6. As shown in cross-section in FIG. 3, the compartment structure 12 is mounted to both the center console 14 and the instrument panel 16 via brackets 26 and 28 and fasteners F. However, as mentioned above, it is only necessary to fix the compartment structure 12 to the center console 14 or to the instrument panel 16.

Figure 3:
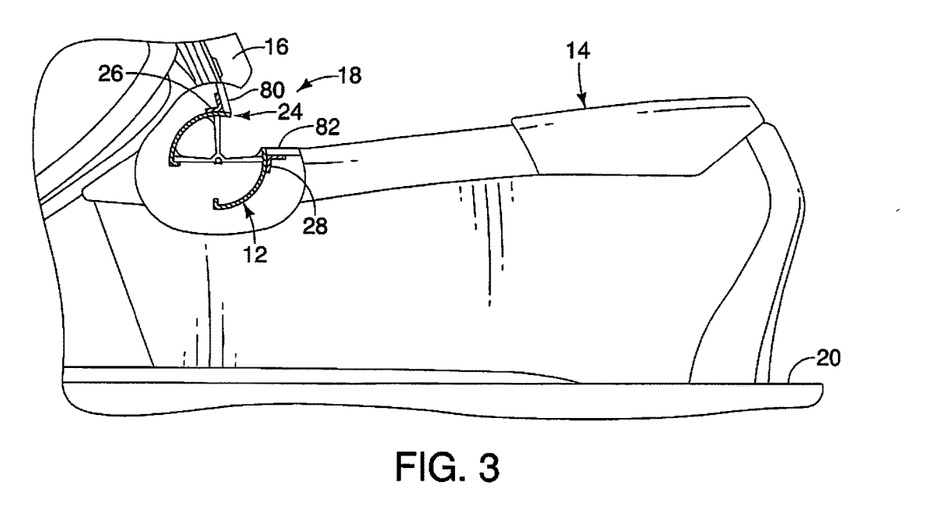
FIG. 3 is another side view and partial cross-sectional view of the portion of the passenger compartment depicted in FIG. 2, showing the storage compartment structure in accordance with the first embodiment.

The compartment structure 12 basically includes a compartment housing 30 and a pivoting structure 32 that is installed within the compartment housing 30 such that the pivoting structure 32 pivots about a pivot axis A that extends through the compartment housing 30 and the pivoting structure 32.

Figure 4:
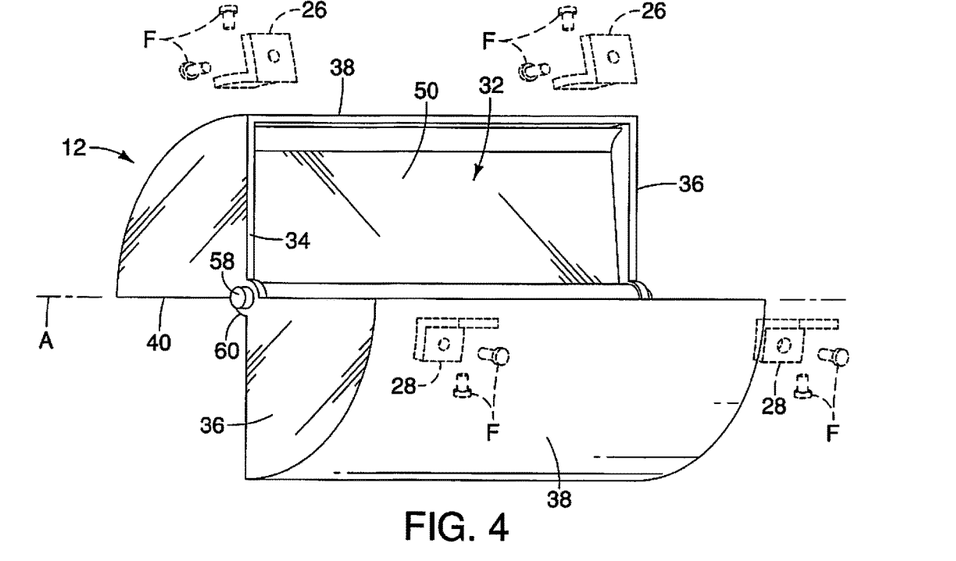
FIG. 4 is a perspective view of the storage compartment structure shown removed from the vehicle showing a compartment housing, a pivoting structure pivotally installed within the compartment housing and a positioning mechanism in accordance with the first embodiment.

The compartment housing 30 has a cylindrical shape (an overall shape that resembles a cylinder) but includes a large gap that extends parallel to the pivot axis and defines a compartment opening 34. In the first embodiment, the compartment housing 30 has two axial end walls 36 and two curved walls 38. The axial end walls 36 have a circular shape, but include gaps, as shown in FIG. 4. One of the gaps partially defines the compartment opening 34. The second of the gaps defines a back side opening 40. As is explained in greater detail below, the compartment opening 34 is provided in order to insert articles in the compartment structure 12 and to access the articles placed within the compartment structure 12. The back side opening 40 is not necessary, but is provide for manufacturing and assembly convenience.

Figure 5:
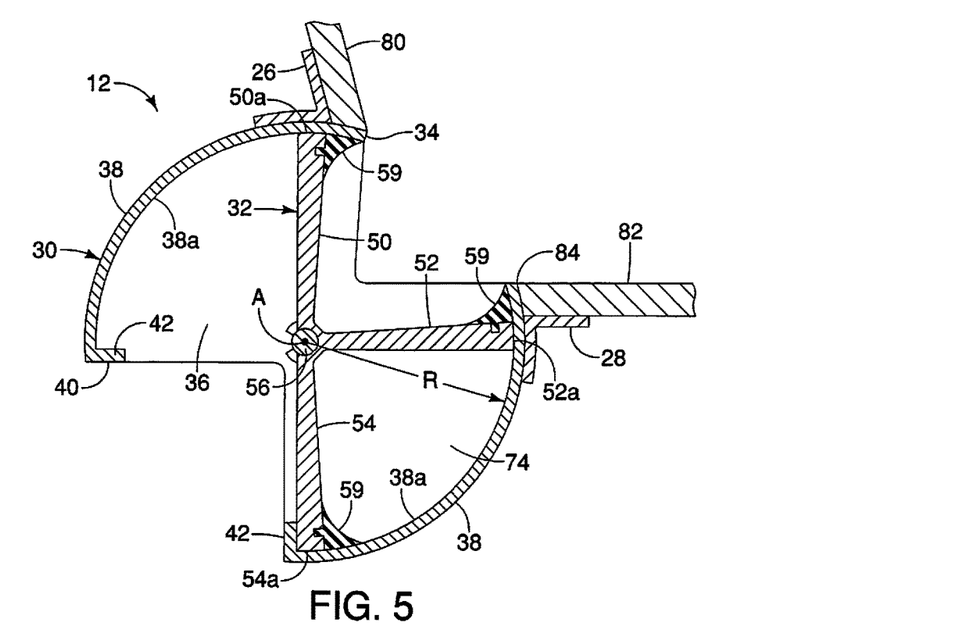
FIG. 5 is a cross-sectional view of the storage compartment structure installed to both the instrument panel and the center console taken along the line 5-5 in FIG. 1, showing the pivoting structure within the compartment housing and pivoted to a first orientation concealing a storage space within the compartment housing in accordance with the first embodiment.
Figure 6:
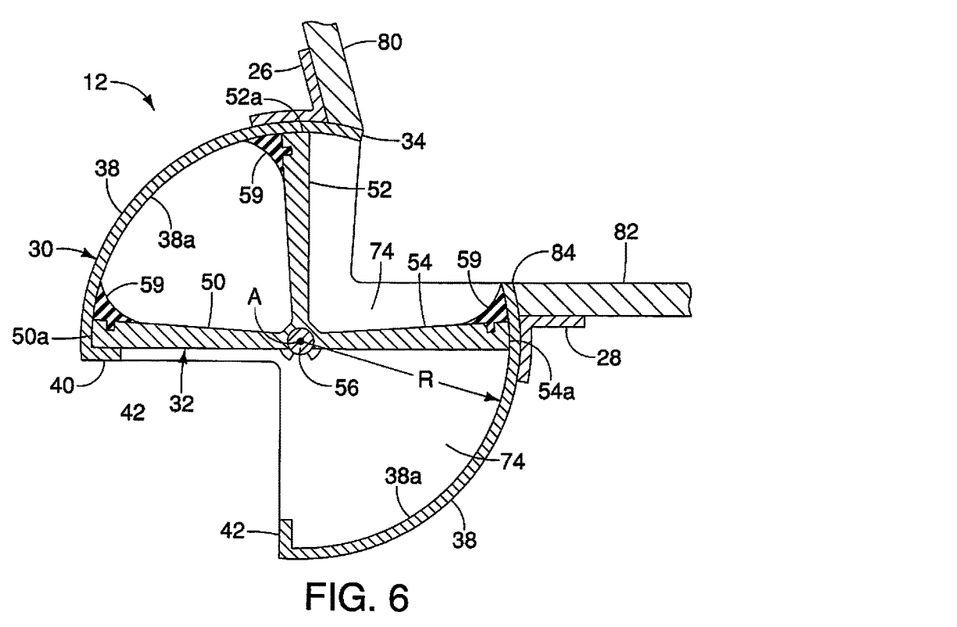
FIG. 6 is another cross-sectional view of the storage compartment structure similar to FIG. 5, showing the pivoting structure pivoted to a second orientation revealing the storage space in accordance with the first embodiment.

The curved walls 38 of the compartment housing 30 have inner curved surfaces 38a centered about the pivot axis A, as shown in FIGS. 5 and 6. As is also shown in FIGS. 5 and 6, adjacent to the back side opening 40, each of the curved walls 38 includes a stop flange 42. The stop flanges 42 extend radially inwardly from the inner curved surfaces 38a toward the pivot axis A. The purpose of the stop flanges 42 is explained in greater detail below.

As shown in FIGS. 5 and 6, the pivoting structure 32 is disposed within the compartment housing 30 for pivoting movement about a pivot axis that extends through the compartment housing 30. The pivoting structure 32 includes a first wall 50, a second wall 52 and a third wall 54, a pivot shaft 56 and a positioning mechanism 58 (a spring-loaded detent mechanism).

Each of the first, second and third walls 50, 52 and 54 extends from the pivot axis A radially outward and away from the pivot shaft 56 (and the pivot axis A) such that distal edges 50a, 52a and 54a of the first, second and third walls 50, 52 and 54 are spaced apart from one another relative to a circumferential direction about the pivot axis A.

The inner curved surfaces 38a are spaced apart from the pivot axis A by an inner radius R, as shown in FIGS. 5 and 6. Each of the first wall 50, the second wall 52 and the third wall 54 has a first dimension measured from the pivot axis A to a corresponding distal edge 50a, 52a and 54a that is approximately equal to the inner radius R. The first, second and third walls 50, 52 and 54 can be formed together as a single, unitary, monolithic element together with the pivot shaft 56 or can be formed as a single unit that is thereafter fixed to the pivot shaft 56.

Each of the first, second and third walls 50, 52 and 54 all include seal members 59 adjacent to their respective distal ends 50a, 52a and 54a and serve several purposes. First, the seals 59 serve to disguise the appearance of the pivoting structure 32 such that it appears to be fixed shelf area of the center console 14. Second, the seals 59 assist in preventing small articles, such as coins or paper clips from interfering with movement of the pivoting structure 32.

The pivot shaft 56 coincides with the pivot axis A. The pivot shaft 56 is fixedly attached to (or unitarily formed with) the first, second and third walls 50, 52 and 54. More specifically, the pivot shaft 56 rotates together with the first, second and third walls 50, 52 and 54 within the compartment housing 30. The pivot shaft 56 is supported in bearing openings (not shown) formed within each of the end walls 36 of the compartment housing 30 such that the pivoting structure 32 pivots within the compartment housing. The pivot shaft 56 further extends through one of the bearing openings in the compartment housing and connects to the positioning mechanism 58, as indicated in FIG. 4.

Figure 7:
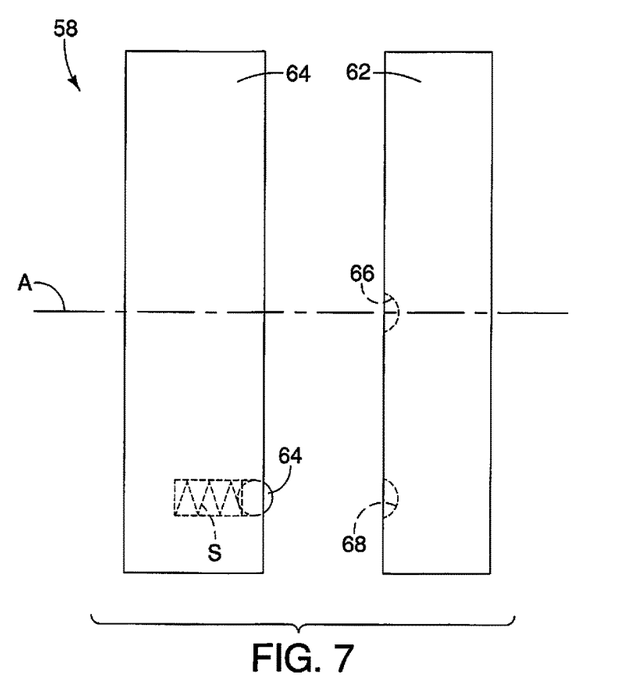
FIG. 7 is a side, exploded view of the positioning mechanism showing a ball-detent arrangement configured to retain the pivoting structure in the first orientation when the pivoting structure is in the first orientation and retain the pivoting structure in the second orientation when the pivoting structure is in the second orientation in accordance with the first embodiment.
Figure 8:
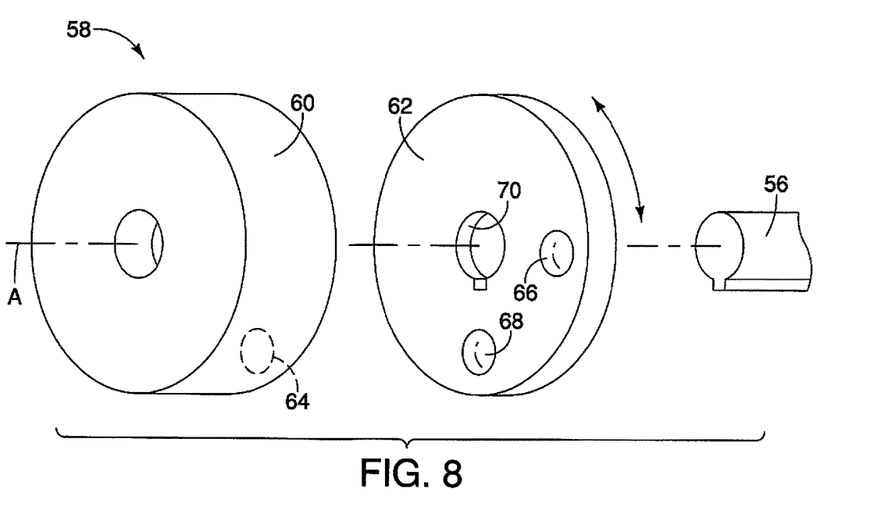
FIG. 8 is a perspective view of the positioning mechanism in accordance with the first embodiment.

As shown in FIGS. 7 and 8 in exploded views, the positioning mechanism 58 includes a first part 60 and a second part 62. The first part 60 includes a spring S that biases a locating pin 64 into engagement with the second part 62. The second part 62 includes a first indentation 66 and a second indentation 68. The first part 60 is fixedly and non-movably attached to the compartment housing 30 and the second part 62 is connected to the pivot shaft 56 for pivoting movement therewith. The locating pin 64 and the first and second indentations 66 and 68 are positioned such that when the locating pin 64 engages the first indentation 66, the pivoting structure 32 is in a first orientation depicted in FIG. 5. Further, when the second part 60 is pivoted such that the locating pin 64 engages the second indentation 66, the pivoting structure 32 is in a second orientation depicted in FIG. 6.

In the first embodiment, the first part 60 if the positioning mechanism 58 is fixed to the compartment housing 30 and the second part 62 is installed to the pivot shaft 56 via an opening 70 that includes a keyway, as shown in FIG. 8. In the installed state, the first part 60 and the second part 62 are pressed toward one another such that the spring S urges the locating pin 64 into contact with the second part 62.

The positioning mechanism 58 is shown in FIG. 4 installed to an exterior surface of the compartment housing 30. Alternatively, the positioning mechanism 58 can be installed within the compartment housing 30.

In an alternative embodiment, the positioning mechanism 58 can be replaced with an electric motor that moves the pivoting structure 32 between the first orientation and the second orientation. The electric motor (not shown) can be operated by a remote switch (not shown) located on the instrument panel 16 such that a vehicle passenger can operate the switch thereby moving the pivoting structure 32 between the first orientation and the second orientation.

As shown in FIGS. 5 and 6, the pivoting structure 32 is pivotal about the pivot axis A between the first orientation (FIG. 5) and the second orientation (FIG. 6). In the first orientation the first wall 50 and the second wall 52 are exposed thru the compartment opening 34, the third wall is concealed within the compartment housing 30, and a storage space 74 defined between the second wall 52 and the third wall 54 is concealed within the compartment housing 30. The pivoting structure 32 can be pushed by a vehicle passenger and moved from the first orientation (FIG. 5) to the second orientation (FIG. 6). The force applied by the vehicle passenger to the pivoting structure 32 must be sufficient to overcome the biasing force of the spring S in order to release the locating pin 64 from the first indentation 66. In the second orientation the second wall 52, the third wall 54 and the storage space 74 are exposed thru the compartment opening 34 with the first wall 50 being concealed within the compartment housing 30.

The pivoting structure 32 can be pushed by the vehicle passenger and moved from the second orientation (FIG. 6) back to the first orientation (FIG. 5). The force applied by the vehicle passenger to the pivoting structure 32 must be sufficient to overcome the biasing force of the spring S in order to release the locating pin 64 from the second indentation 66.

In the first embodiment, the positioning mechanism 58 is provided to retain the pivoting structure 32 in one of the first orientation (FIG. 5) and the second orientation (FIG. 6). The stop flanges 42 are provided to limit pivoting movement of the pivoting structure 32 within the compartment housing 30. More specifically, the stop flanges 42 are dimensioned and positioned to limit movement of the pivoting structure 32 only to movement between the first orientation and the second orientation.

An advantage of the compartment structure 12 is that the storage space 74 is completely hidden and concealed with the pivoting structure 32 in the first orientation (FIG. 5). When the pivoting structure 32 is pivoted about the pivot shaft 56 and pivot axis A to the second orientation (FIG. 6), the storage space 74 is easily accessed. When the pivoting structure 32 is returned to the first orientation (FIG. 5), the storage space 74 is again concealed.

The compartment structure 12 is installed to one or both of the center console 14 and the instrument panel 16 such that the existence of the storage space 74 is obscured and inconspicuous. Specifically, the center console 14 and the instrument panel 16 define an interior trim structure that are preferably designed and shaped to complement one another. The area 24 where the center console 14 and the instrument panel 16 intersect is a typical area for a shelf to place, for example, change, keys or a phone. An intruder in the vehicle would not likely believe a hidden compartment (the storage space 74) exists in that location.

In the first embodiment, the instrument panel 16 defines a first trim surface 80 and the center console 14 defines a second trim surface 82. The first trim surface 80 is an upwardly extending surface and the second trim surface is a horizontally extending surface 82. The first trim surface 80 and the second trim surface 82 are angularly offset from one another. Further as shown in FIGS. 5 and 6, the first trim surface 80 and the second trim surface 80 define a main opening 84 located between the first trim surface 80 and the second trim surface 82. As shown in FIGS. 5 and 6, the compartment housing 12 is fixedly attached within the interior trim structure defined by the center console 14 and the instrument panel 16 such that the compartment opening 34 is aligned with the main opening 84. Further, the compartment opening 34 is fully exposed via the main opening 84.

In the first embodiment, the first trim surface 80 and the second trim surface 82 define an angle therebetween that is greater than 90 degrees and less than 135 degrees. Further, the first trim surface 80 and the second trim surface 82 can be perpendicular to one another, depending upon the vehicle interior design.

It should be understood from FIGS. 5 and 6 that the first trim surface 80 a first edge that at least partially defines the main opening 84. As shown in FIG. 5, with the pivoting structure 32 in in the first orientation the first wall 50 extends from the pivot axis A to the compartment housing 30 such that the distal edge 50a of the first wall 50 is located adjacent to the first edge of the first trim surface 80. As shown in FIG. 6 in the second orientation, the second wall 52 extends from the pivot axis A to the compartment housing 30 such that the distal edge 52a of the second wall 52 is located adjacent to the first edge of the first trim surface 80.

Second Embodiment

Figure 9:
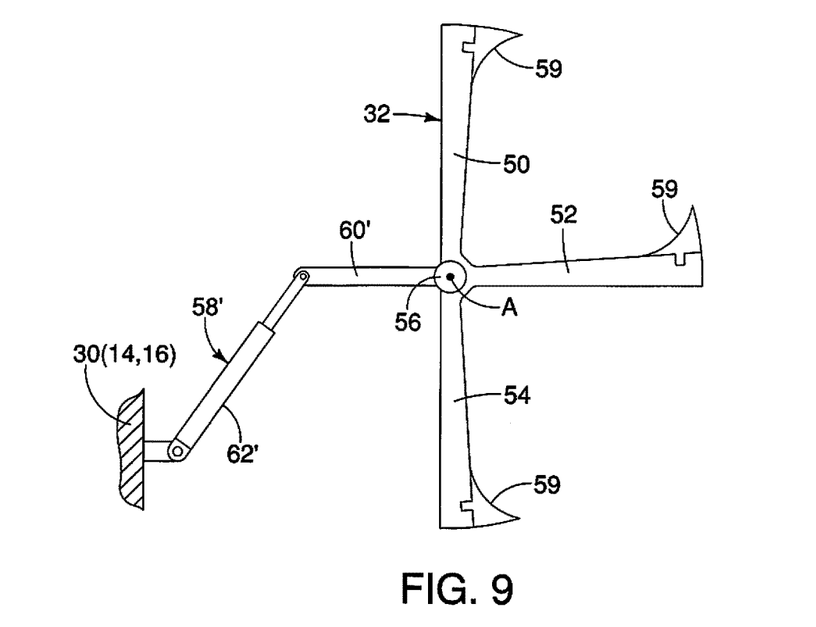
FIG. 9 is a side schematic view of a positioning mechanism and the pivoting structure shown removed from the compartment housing, the positioning mechanism including an over-center biasing structure retaining the pivoting structure in the first orientation in accordance with a second embodiment.
Figure 10:
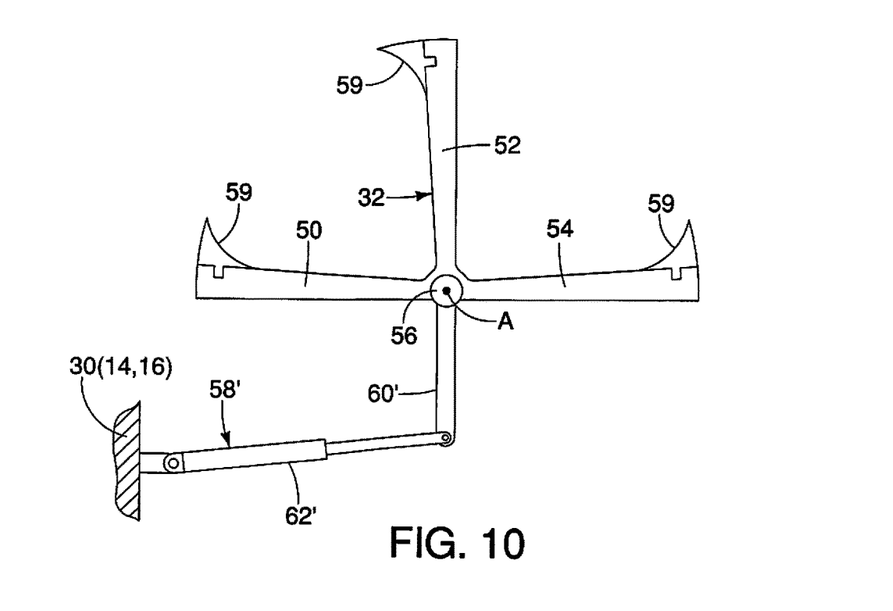
FIG. 10 is another side schematic view of the positioning mechanism and the pivoting structure similar to FIG. 9, shown retaining the pivoting structure in the second orientation in accordance with the second embodiment.

Referring now to FIGS. 9 and 10, a portion of a compartment structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the pivoting structure 32 is identical to that described above with respect to the first embodiment, except that the positioning mechanism 58 has been replaced with a positioning mechanism 58'. For the sake of brevity and simplicity, the compartment housing 30 is omitted from FIGS. 9 and 10, but is identical to that described above with respect to the first embodiment.

The positioning mechanism 58' is an over-center biasing mechanism that biases the pivoting structure 32 to remain in both the first orientation and the second orientation. More specifically, the positioning mechanism 58' (the over-center biasing mechanism) biases the pivoting structure 32 to remain in the first orientation (FIG. 9) with the pivoting structure 32 already in in the first orientation and biases the pivoting structure 32 to remain in the second orientation (FIG. 10) with the pivoting structure 32 already in the second orientation. The positioning mechanism 58' includes a lever 60' and a biasing device 62'. The lever 60' is fixedly attached to the pivot shaft 56 for pivoting movement therewith such that the lever 60' moves with movement of the pivoting structure 32. The biasing device 62' can be a spring or a piston device that is filled with a compressible substance such as a gas. The biasing device 62' has a first end and a second end. The first end is fixed to one or more of the compartment housing 30, the center console 14 and the instrument panel 16. The second end of the biasing device 62' is fixed to the lever 60'. The biasing device 62' resists being compressed and therefore exerts a biasing force against both the compartment housing 30 and the lever 60'. A vehicle passenger pressing on the pivoting structure 32 must exert sufficient force to overcome the biasing force of the biasing device 62' in order to move the pivoting structure 32 between the first orientation (FIG. 9) and the second orientation (FIG. 10).

Third Embodiment

Figure 11:
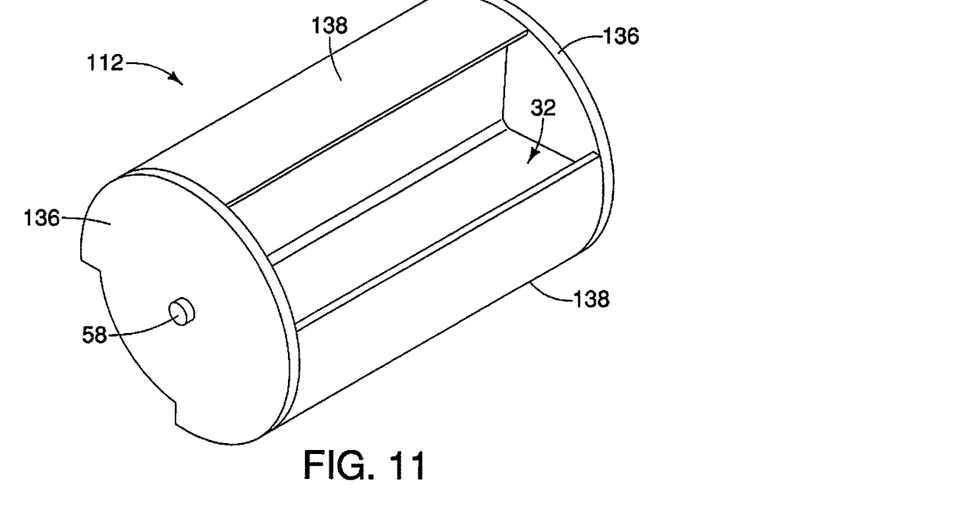
FIG. 11 is a perspective view of a storage compartment structure shown removed from the vehicle in accordance with a third embodiment.
Figure 12:
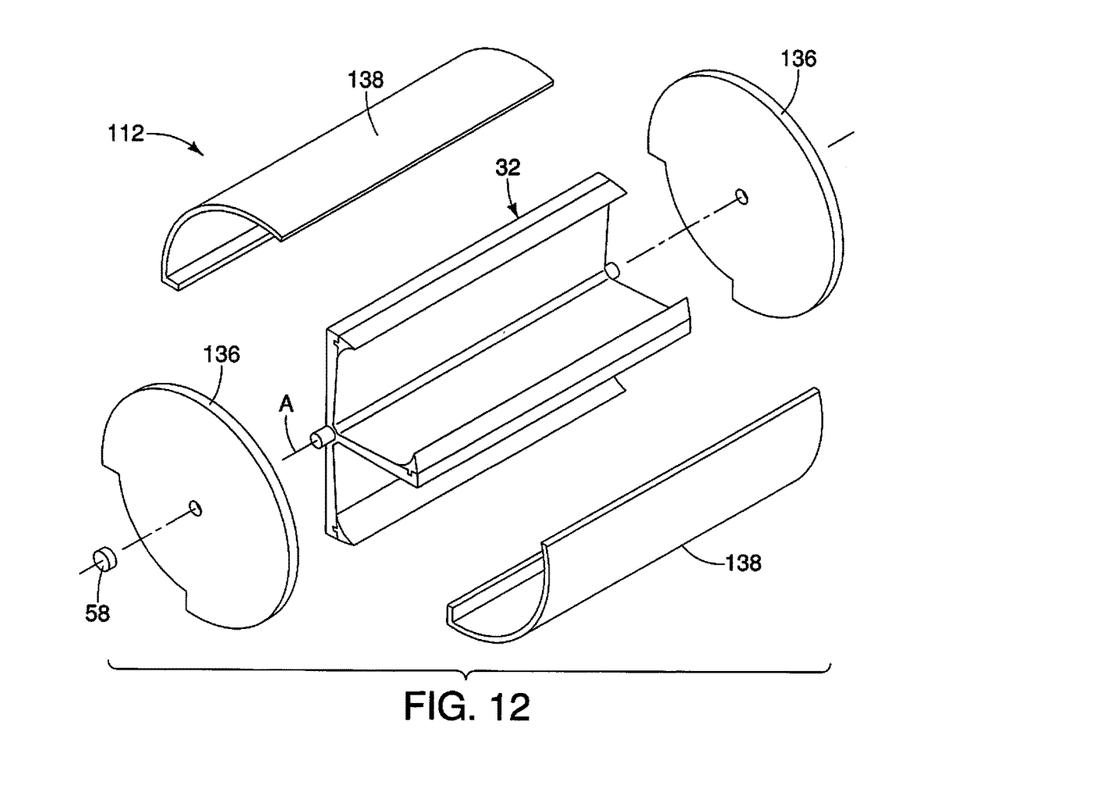
FIG. 12 is an exploded perspective view of the storage compartment structure in accordance with the third embodiment.

Referring now to FIGS. 11 and 12, a compartment structure 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the compartment structure 112 includes a compartment housing 130 and the pivoting structure 32 as described above with respect to the first embodiment. However, in the third embodiment, the compartment housing 130 is constructed from several elements, such as end walls 136 and curved wall portions 138. The end walls 136 can be attached to the curved wall portions 138 via adhesives, heat welding, or mechanical fasteners (not shown).

Fourth Embodiment

Figure 13:
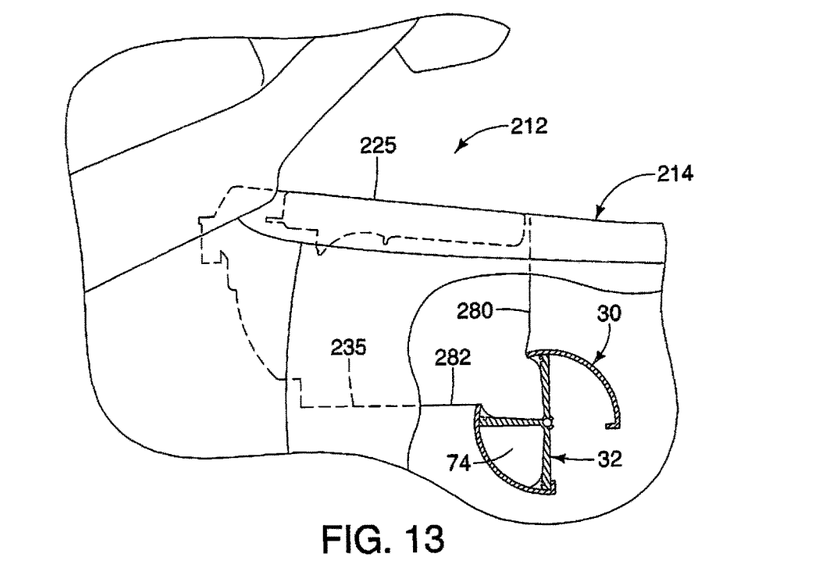
FIG. 13 is a side partial cross-sectional view of a center console having a lid that covers a compartment with the storage compartment structure located at lower area of the compartment of the center console, the pivoting structure of the storage compartment structure shown in the first orientation in accordance with a fourth embodiment.
Figure 14:
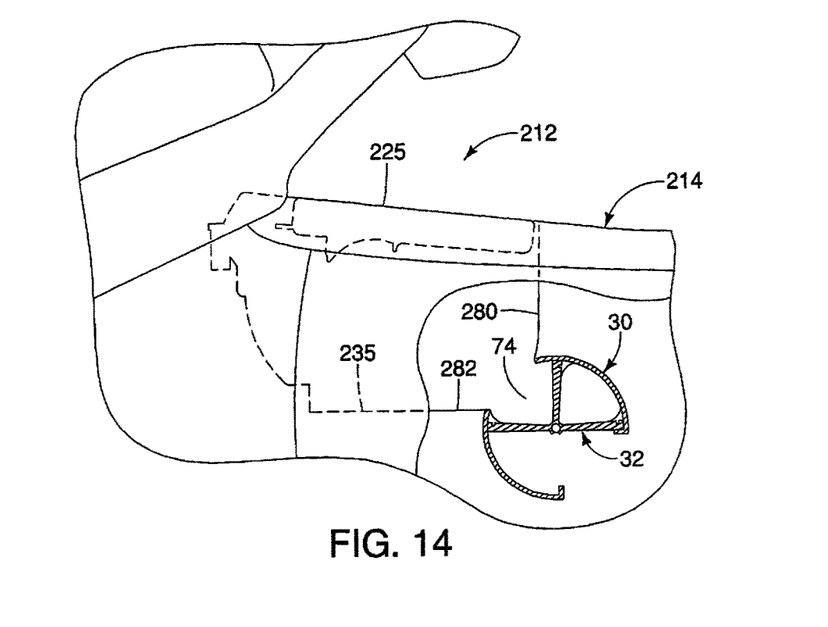
FIG. 14 is another side partial cross-sectional view of the center console and the storage compartment structure depicted in FIG. 13, with the pivoting structure of the storage compartment structure shown in the second orientation in accordance with the fourth embodiment.

Referring now to FIGS. 13 and 14 a compartment structure 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the compartment structure 212 includes the compartment housing 30 and the pivoting structure 32 as described above in the first embodiment. However, in the fourth embodiment, the compartment structure 212 is installed within a center console 214 that includes a compartment lid 225 that opens to access a compartment 235 within the center console 214. The compartment 235 includes an upright wall 280 and a horizontal wall 282 that are perpendicular to one another. The housing 30 is installed at an opening defined between the upright wall 280 and the horizontal wall 282 at the bottom of the compartment 235. The pivoting structure 32 can be pivoted within the compartment housing 30 between the first orientation (FIG. 13) and a second orientation (FIG. 14) to access the hidden storage space 74 therein.

Fifth Embodiment

Referring now to FIG. 15-22 a compartment structure 312 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Figure 15:
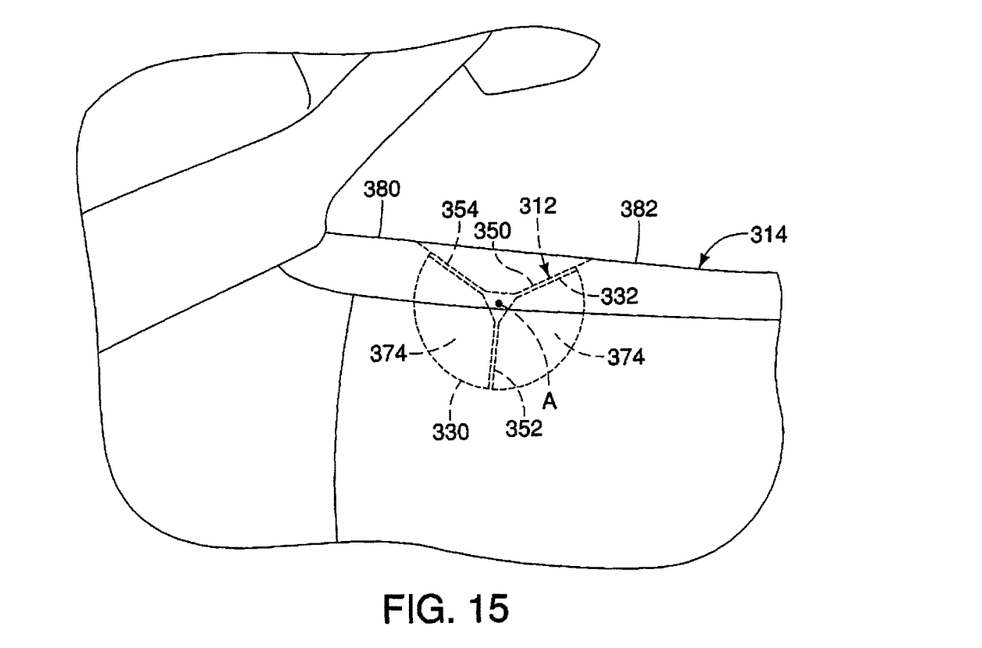
FIG. 15 is a side view of a center console that includes a storage compartment structure that includes a compartment housing and a pivoting structure within the compartment housing, the pivoting structure of the storage compartment structure shown in a first orientation in accordance with a fifth embodiment.
Figure 16:
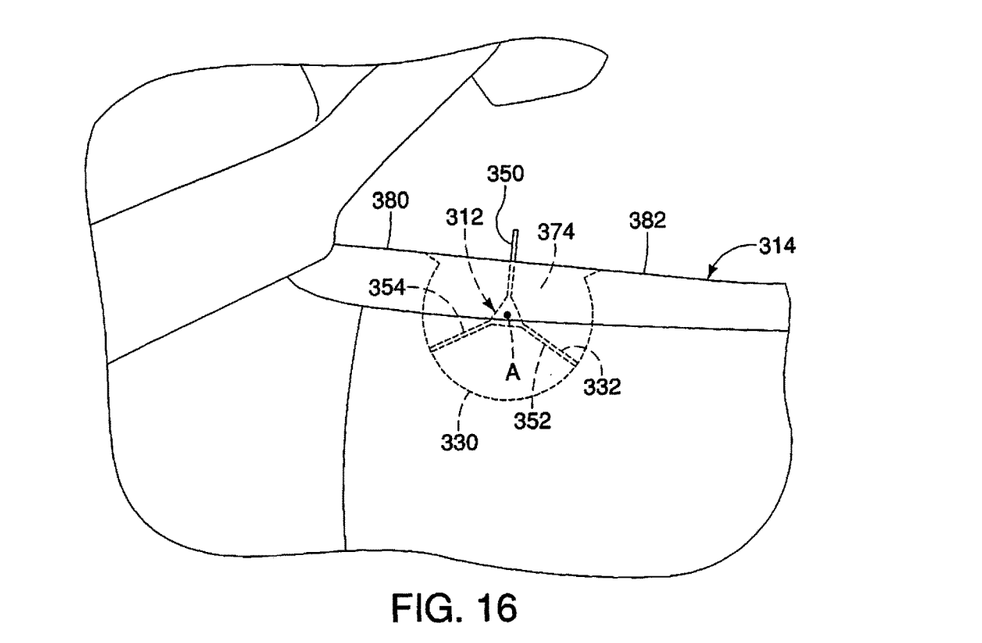
FIG. 16 is another side view of the center console and the storage compartment structure with the pivoting structure of the storage compartment structure shown in a second orientation in accordance with the fifth embodiment.
Figure 17:
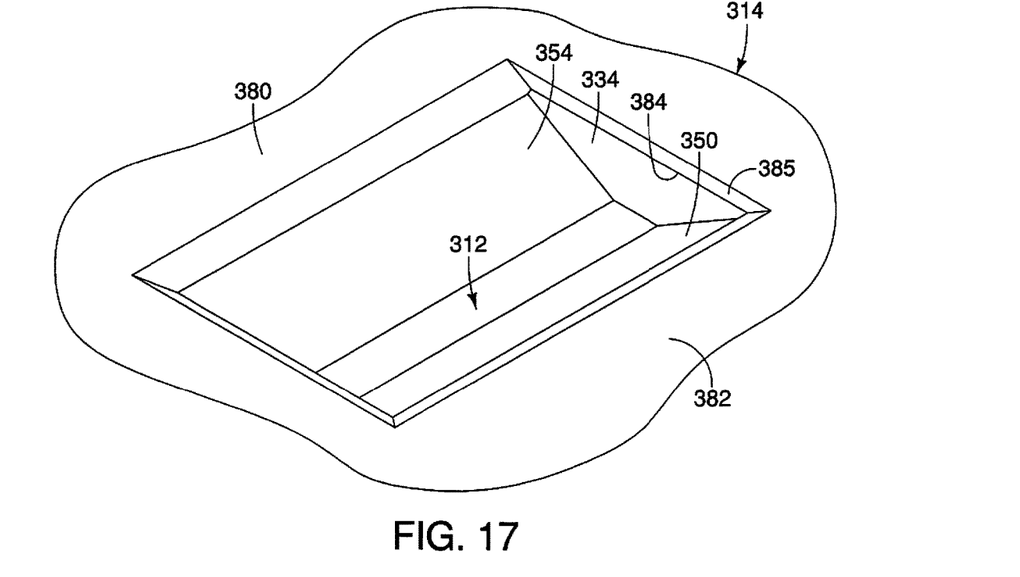
FIG. 17 is a perspective view of an upper surface of the center console showing the pivoting structure of the storage compartment structure in the first orientation with two storage spaces being concealed within the compartment housing in accordance with the fifth embodiment.
Figure 18:
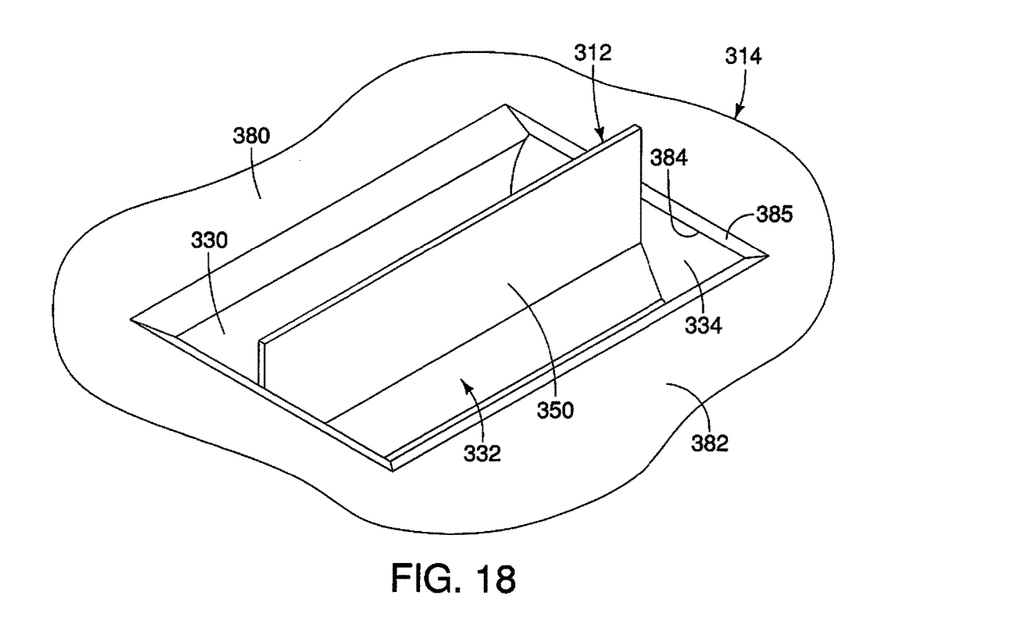
FIG. 18 is another perspective view of the upper surface of the center console showing the pivoting structure of the storage compartment structure in the second orientation exposing one of the two storage spaces in accordance with the fifth embodiment.
Figure 19:
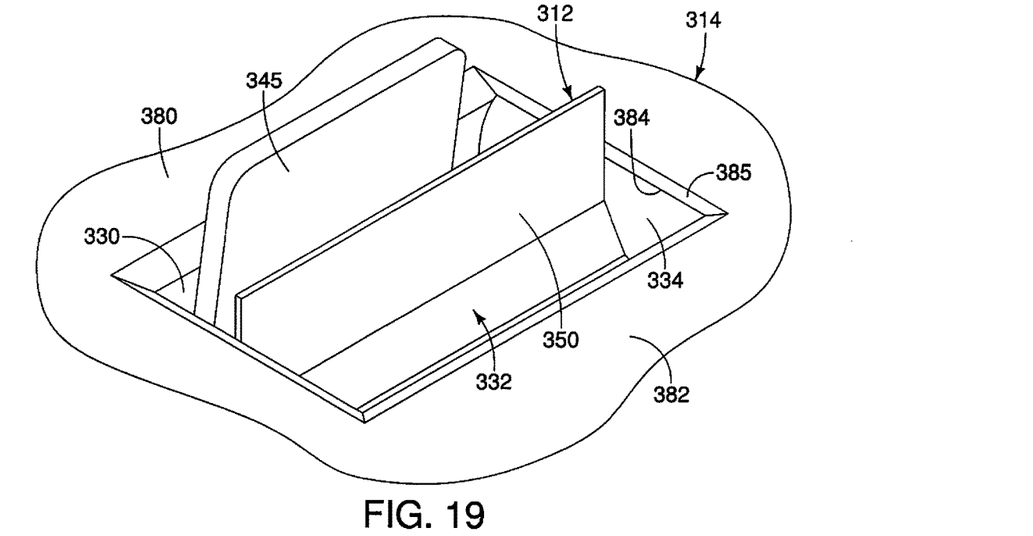
FIG. 19 is yet another perspective view of the upper surface of the center console showing the pivoting structure of the storage compartment structure in the second orientation with a mobile phone inserted into the storage compartment structure in accordance with the fifth embodiment.

In the fifth embodiment, a center console 314 includes the compartment structure 312. As shown in FIGS. 15 and 16, the compartment structure 312 includes a compartment housing 330 and a pivoting structure 332. The pivoting structure 332 pivots within the compartment housing 330 between a first orientation (FIGS. 15, 17 and 21) concealing two storage spaces 374 and a second orientation (FIGS. 16, 18, 19 and 22) exposing one of the storage spaces 374.

The center console 314 includes a first surface portion 380 and a second surface portion 382. The first and second surface portions 380 and 382 are co-planar and define a main opening 384 therebetween. The center console 314 also includes a recessed area 385 that surrounds the main opening 384, as shown in FIGS. 17-19 and 21-22

Figure 20:
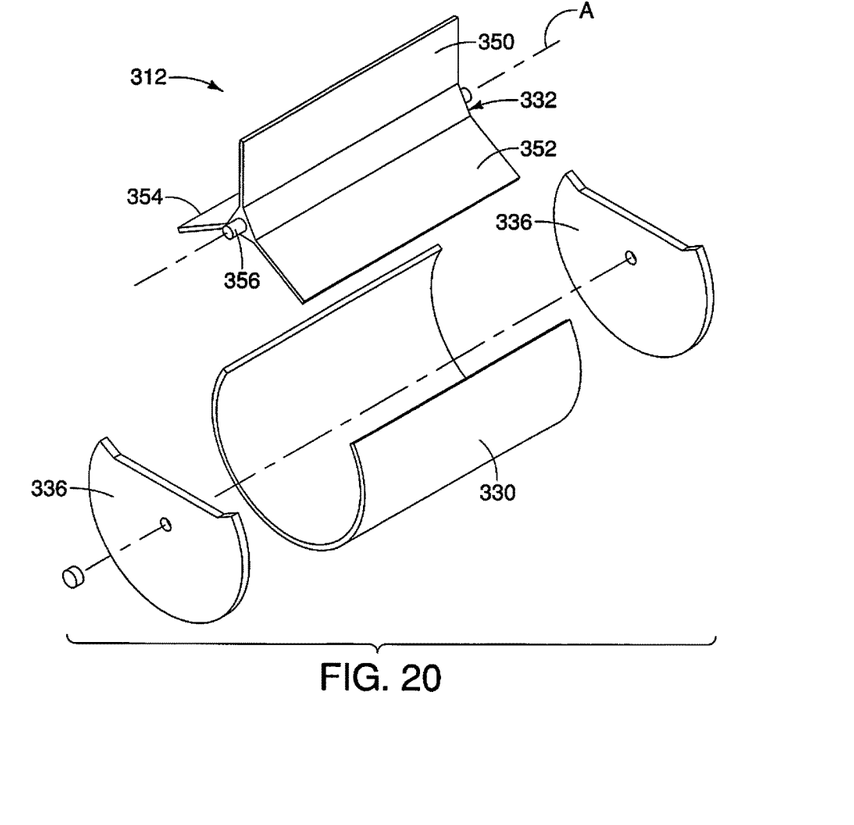
FIG. 20 is an exploded perspective view of the storage compartment structure in accordance with the fifth embodiment.
Figure 21:
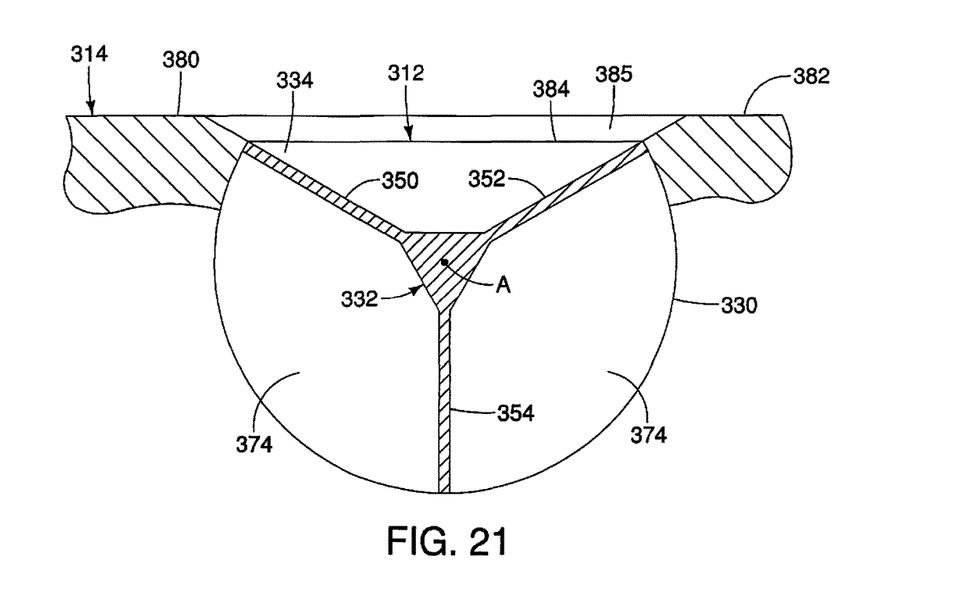
FIG. 21 is a side view of the storage compartment structure with the pivoting structure shown in the first orientation in accordance with the fifth embodiment.
Figure 22:
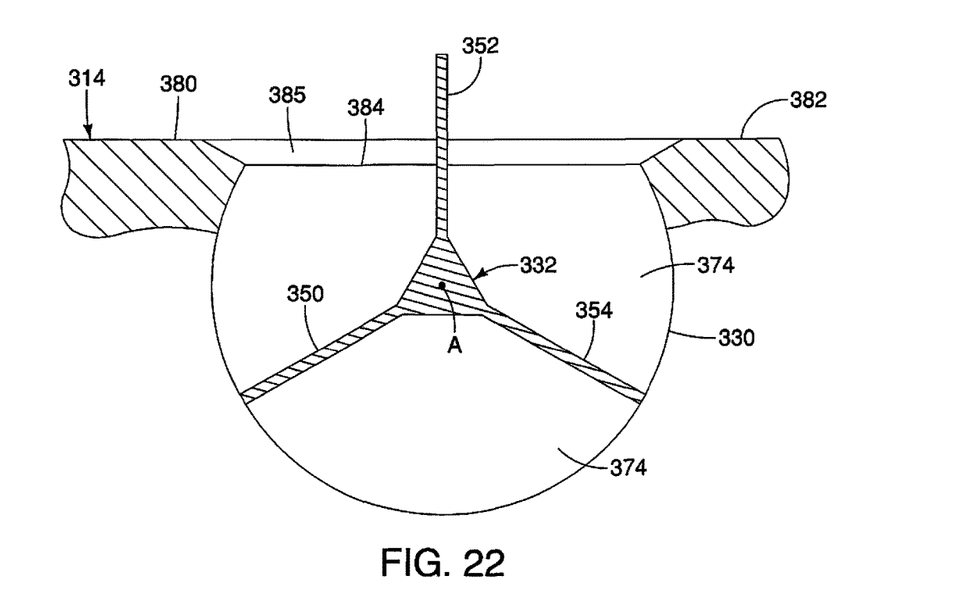
FIG. 22 is another side view of the storage compartment structure with the pivoting structure shown in the second orientation in accordance with the fifth embodiment.

As shown in FIG. 20, the compartment housing 330 has an overall cylindrical shape and end walls 336. The pivoting structure 332 includes a first wall 350, a second wall 352, a third wall 354 and a pivot shaft 356. The first, second and third walls 350, 352 and 354 are all fixedly attached to (or formed integrally with) the pivot shaft 356. The first wall 350 is angularly offset from each of the second wall 352 and the third wall 354 by an angle of approximately 120 degrees relative to the pivot shaft 356 (and the pivot axis A). Similarly, the second wall 352 is angularly offset from each of the first wall 350 and the third wall 354 by an angle of approximately 120 degrees.

As shown in FIGS. 16, 18, 19 and 22, the pivoting structure 332 can be pivoted to the second orientation exposing one or the other of the two storage spaces 74. Further, when in the second orientation, the compartment structure 312 can receive, for example, a mobile phone or other hand held device. As shown FIGS. 15, 17 and 21 with the pivoting structure 332 in the first orientation, the first wall 350 and the third wall 354 are shaped and positioned to blend in with the recessed area 385 giving the overall appearance of being a storage space for receiving keys, loose change or other article. Thus, the storage compartment structure 312 is configured to conceal the storage spaces 374 and make it appear that no such storage space exists.

It should be understood that either of the two storage spaces 374 can be accessed, depending upon the direction of rotation or pivoting movement of the \pivoting structure 332.

Sixth Embodiment

Figure 23:
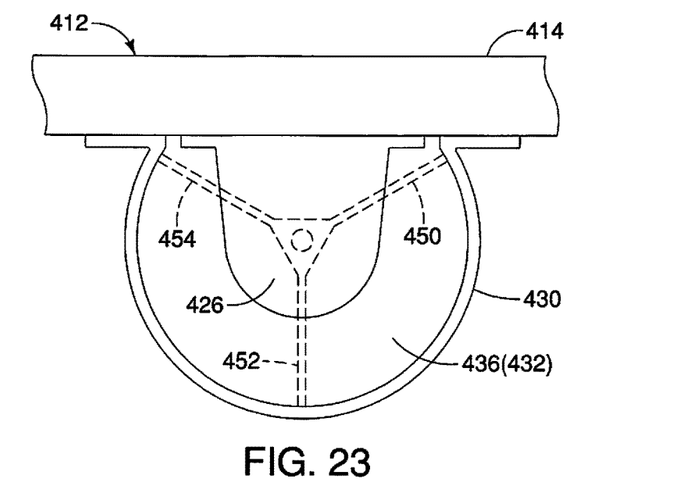
FIG. 23 is a side view of a center console and a storage compartment structure in accordance with a sixth embodiment.
Figure 24:
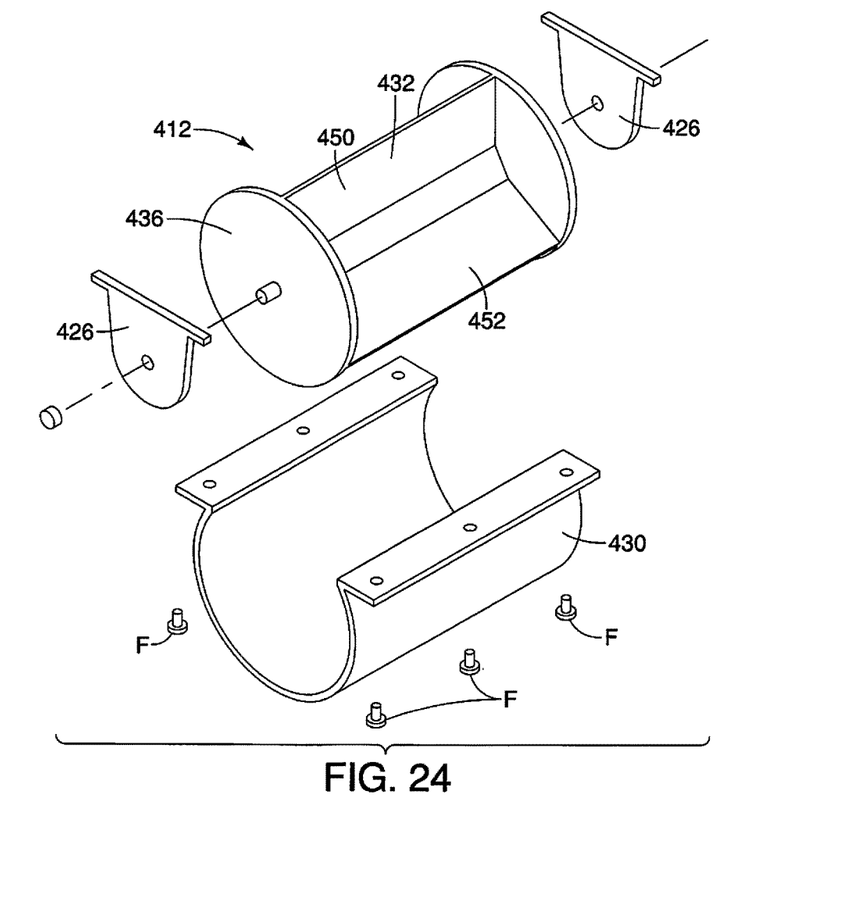
FIG. 24 is an exploded view of the storage compartment structure in accordance with the sixth embodiment.

Referring now to FIGS. 23 and 24, a compartment structure 412 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the compartment structure 412 includes a pair of support brackets 426, a compartment housing 430 and a pivoting structure 432. The support brackets 426 are fixed to an underside surface of a center console 414 via fasteners (not shown), or alternatively can be molded as a part of the center console 414. The compartment housing 430 as an overall cylindrical shape with flanges that attached to an underside surface of a center console 414 via fasteners F. The pivoting structure 432 includes first, second and third walls 450, 452 and 454 that are arranged in configuration similar to the pivoting structure 332 of the fifth embodiment. However, in the sixth embodiment, the pivoting structure 432 includes end walls 436 that are fixed to edges of each of the first, second and third walls 450, 452 and 454, as shown in FIG. 24.

The vehicle elements depicted in the drawings are conventional components that are well known in the art. Since vehicle elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle storage structure. Accordingly, these terms, as utilized to describe the present invention should be interpreted relative to a vehicle equipped with the vehicle storage structure.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage compartment structure, comprising:
a compartment housing having a curved wall portion that is fixedly installed within a vehicle passenger compartment, the compartment housing defining a compartment opening and a pivot axis, the curved wall portion further defining an inner curved surface that extends in a circumferential direction about the pivot axis and is spaced apart from the pivot axis by an inner radius; and a pivoting structure disposed within the compartment housing for pivoting movement about the pivot axis, the pivoting structure having a first wall, a second wall and a third wall each extending from the pivot axis outward and away therefrom such that distal edges of each of the first, second and third walls are spaced apart from one another relative to the circumferential direction about the pivot axis, the pivot axis is a first dimension away from a distal edge of the first wall, the pivot axis is the first dimension away from a distal edge of the second wall, the pivot axis is the first dimension away from a distal edge of the third wall, with the distal edge of each of the first, second and third walls extending in directions parallel to the pivot axis, the first dimension being approximately equal to the inner radius, the pivoting structure being pivotal about the pivot axis between a first orientation and a second orientation such that in the first orientation the first wall and the second wall are exposed thru the compartment opening with the third wall is concealed within the compartment housing, and a storage space defined between the second wall and the third wall is concealed within the compartment housing, in the second orientation the second wall, the third wall and the storage space are exposed thru the compartment opening with the first wall being concealed within the compartment housing, and the pivoting structure is configured such that the distal edge of the first wall slides along the inner curved surface of the curved wall portion in response to movement between the first orientation and the second orientation.

2. The vehicle storage compartment structure according to claim 1, wherein the compartment housing has an overall cylindrical-like shape defining the inner curved surface with the pivot axis defining a center thereof, with the portion of the compartment housing that conceals the storage space being defined along the inner curved surface.

3. The vehicle storage compartment structure according to claim 1, wherein the pivoting structure includes an over-center biasing mechanism that biases the pivoting structure to both of the first orientation and the second orientation.

4. The vehicle storage compartment structure according to claim 1, wherein the pivoting structure includes a spring-loaded detent mechanism configured to retain the pivoting structure in the first orientation with the pivoting structure in the first orientation and configured to retain the pivoting structure in the second orientation with the pivoting structure in the second orientation.

5. The vehicle storage compartment structure according to claim 1, wherein the compartment housing includes stop flanges that limit pivoting movement of the pivoting structure to movement between the first orientation and the second orientation, with one of the stop flanges extending radially inward toward the pivot axis from the inner curved surface.

6. The vehicle storage compartment structure according to claim 1, further comprising an interior trim structure having a first trim surface and a second trim surface angularly offset from one another, and the interior trim structure defining a main opening located between the first trim surface and the second trim surface, the compartment housing being fixedly attached within the interior trim structure such that the compartment opening is aligned with the main opening and is exposed via the main opening.

7. The vehicle storage compartment structure according to claim 6, wherein the first trim surface is an upwardly extending surface and the second trim surface is a horizontally extending surface.

8. The vehicle storage compartment structure according to claim 6, wherein the first trim surface is perpendicular to the second trim surface.

9. The vehicle storage compartment structure according to claim 6, wherein the first trim surface and the second trim surface define an angle therebetween that is greater than 90 degrees and less than 135 degrees.

10. The vehicle storage compartment structure according to claim 6, wherein the first trim surface of the interior trim structure includes a first edge that at least partially defines the main opening, and in the first orientation the first wall extends from the pivot axis to the compartment housing such that the distal edge of the first wall is located adjacent to the first edge of the first trim surface.

11. The vehicle storage compartment structure according to claim 10, wherein in the second orientation the second wall extends from the pivot axis to the compartment housing such that the distal edge of the second wall is located adjacent to the first edge of the first trim surface.

12. The vehicle storage compartment structure according to claim 6, wherein the first trim surface is an instrument panel that extends upwardly, and the second trim surface is an upper horizontally oriented surface of a center console.

13. The vehicle storage compartment structure according to claim 1, further comprising an interior trim structure having a first trim surface portion and a second trim surface portion that are co-planar, and the interior trim structure defining a main opening located between the first trim surface portion and the second trim surface portion, the compartment housing being fixedly attached within the interior trim structure such that the compartment opening is aligned with the main opening and is exposed via the main opening.

14. The vehicle storage compartment structure according to claim 1, wherein the first wall and the third wall each extend from opposite sides of the pivot axis outward and away therefrom, with the first wall and the third wall being co-planar, the second wall extending from the pivot axis perpendicular to the first and third walls.

15. The vehicle storage compartment structure according to claim 14, wherein the compartment housing includes a second curved wall portion non-movably positioned relative to the curved wall portion, the second curved wall portion being located at a side of the pivot axis opposite the curved wall portion, the second curved wall portion defining a second inner curved surface, and the pivoting structure is further configured such that the distal edge of the third wall slides along the second curved wall portion in response to movement between the first orientation and the second orientation.

16. A vehicle storage compartment structure comprising
an interior trim structure having a first trim surface and a second trim surface angularly offset from one another, and the first trim surface having a first edge and the second trim surface having a second edge, the first edge and the second edge defining a main opening between the first trim surface and the second trim surface;
a compartment housing fixedly attached within a vehicle passenger compartment and defining a compartment opening that is aligned with the main opening;
a pivoting structure disposed within the compartment housing for pivoting movement about a pivot axis that extends through the compartment housing, the pivoting structure having a first wall, a second wall and a third wall, the first wall and the third wall each extending from opposite sides of the pivot axis outward and away therefrom, with the first wall and the third wall being co-planar, the second wall extending from the pivot axis perpendicular to the first and third walls, the pivoting structure being pivotal about the pivot axis between a first orientation and a second orientation such that
in the first orientation a distal edge of the first wall is positioned adjacent to the first edge of the first trim surface, a distal edge of the second wall is positioned adjacent to the second edge of the second trim surface and a storage space defined between the second wall and the third wall is concealed within the compartment housing, and
in the second orientation the distal edge of the second wall is positioned adjacent to the first edge of the first trim surface, a distal edge of the third wall is positioned adjacent to the second edge of the second trim surface and the storage space is exposed through the compartment opening and the main opening.

17. The vehicle storage compartment structure according to claim 16, wherein
the compartment housing has an overall cylindrical-like shape defining a first inner curved surface with the pivot axis defining a center thereof, with the compartment opening having a lengthwise direction that is parallel to the pivot axis.

18. The vehicle storage compartment structure according to claim 17, wherein
the compartment housing includes a first curved wall portion that defines the first inner curved surface, the first inner curved surface extending in a circumferential direction about the pivot axis and is spaced apart from the pivot axis by an inner radius, and
the pivot axis is a first dimension away from a distal edge of the first wall, the pivot axis is the first dimension away from a distal edge of the second wall, the pivot axis is the first dimension away from a distal edge of the third wall, with the distal edge of each of the first, second and third walls extending in directions parallel to the pivot axis, the first dimension being approximately equal to the inner radius.

19. The vehicle storage compartment structure according to claim 18 wherein
the pivoting structure is configured such that the distal edge of the first wall slides along the first inner curved surface of the curved wall portion in response to movement between the first orientation and the second orientation.

20. The vehicle storage compartment structure according to claim 19, wherein
the compartment housing includes a second curved wall portion non-movably positioned relative to the first curved wall portion, the second curved wall portion being located at a side of the pivot axis opposite the first curved wall portion, the second curved wall portion defining a second inner curved surface, and
the pivoting structure is further configured such that the distal edge of the third wall slides along the second curved wall portion in response to movement between the first orientation and the second orientation.

* * * * *